(12) United States Patent
Mirsky et al.

(10) Patent No.: US 9,509,599 B2
(45) Date of Patent: Nov. 29, 2016

(54) SELF-BOOTSTRAPPING BFD SESSION OVER MPLS LSP

(71) Applicant: Telefonaktiebolaget L M Ericsson (publ), Stockholm (SE)

(72) Inventors: Gregory Mirsky, Pleasanton, CA (US); Evgeny Tantsura, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 371 days.

(21) Appl. No.: 14/451,261

(22) Filed: Aug. 4, 2014

(65) Prior Publication Data
US 2016/0036695 A1 Feb. 4, 2016

(51) Int. Cl.
H04L 12/26 (2006.01)
H04L 12/723 (2013.01)
H04L 12/703 (2013.01)

(52) U.S. Cl.
CPC ......... H04L 45/507 (2013.01); H04L 43/0811 (2013.01); H04L 43/10 (2013.01); H04L 45/28 (2013.01)

(58) Field of Classification Search
None
See application file for complete search history.

(56) References Cited

U.S. PATENT DOCUMENTS

| | | | | |
|---|---|---|---|---|
| 8,902,780 B1 * | 12/2014 | Hegde | ............... | H04L 45/70 370/252 |
| 2007/0207591 A1 * | 9/2007 | Rahman | ............... | H04L 45/00 438/439 |
| 2008/0008174 A1 * | 1/2008 | Hallivuori | ............. | H04L 49/552 370/389 |
| 2013/0028099 A1 * | 1/2013 | Birajdar | ................. | H04L 45/28 370/242 |
| 2014/0307564 A1 * | 10/2014 | Li | ......................... | H04L 67/141 370/242 |
| 2015/0124626 A1 * | 5/2015 | Sul | ......................... | H04L 45/50 370/241.1 |
| 2015/0236920 A1 * | 8/2015 | Bevilacqua | ............. | H04L 41/12 709/224 |

OTHER PUBLICATIONS

"OSI IS-IS Intra-domain Routing Protocol", *Network Working Group*; RFC 1142; David Oran, Editor; Feb. 1990; 152 pages.
(Continued)

*Primary Examiner* — Wei Zhao
*Assistant Examiner* — Ronald H Davis
(74) *Attorney, Agent, or Firm* — Nicholson De Vos Webster & Elliott, LLP

(57) ABSTRACT

A method is implemented by a network device in a network implementing penultimate hop popping (PHP) for Internet Protocol (IP)/Multi-Protocol Label Swapping (MPLS). The network has a plurality of nodes. The method establishes a bi-directional forwarding detection (BFD) session between an active node and a passive node of an MPLS label switched path (LSP) without an out of band bootstrapping process. In this method the network device is the passive node. The passive node generates a My Discriminator for the passive node, where the Your Discriminator is empty and the source label and My Discriminator are known to the passive node. The passive node sends further BFD control packets to the active node that include the generated My discriminator for the passive node.

20 Claims, 8 Drawing Sheets

(56) References Cited

OTHER PUBLICATIONS

"Transmission Control Protocol; DARPA Internet Program; Protocol Specification", *RFC 793*; Sep. 1981; 85 pages.
Aggarwal, R., et al., "Bidirection Forwarding Detection (BFD) for MPLS Label Switched Paths (LSPs)", *Internet Engineering Task Force(IETF)*; RFC 5884; Jun. 2010; 12 pages.
Ali, Z., et al., "Node-IDS Based Resource Reservation Protocol (RSVP) Hello: A Clarification Statement", *Network Working Group*; RFC 4558; Jun. 2006; 7 pages.
Andersson, L., et al., "LDP Specification", *Network Working Group*; RFC 5036; Oct. 2007; 135 pages.
Awduche, D., et al., "RSVP-TE: Extensions to RSVP for LSP Tunnels", *Network Working Group*; RFC 3209; Dec. 2001; 61 pages.
Babiarz, J., et al., "Configuration Guidelines for DiffServ Service Classes", *Network Working Group*; RFC 4594; Aug. 2006; 57 pages.
Baker, F., et al., "A Differentiated Services Code Point (DSCP) for Capacity-Admitted Traffic", *Internet Engineering Task Force(IETF)*; RFC 5865; May 2010; 14 pages.
Baker, F., et al., "Management Information Base for the Differentiated Services Architecture", *Network Working Group*; RFC 3289; May 2002; 107 pages.
Berger, L., "Generalized Multi-Protocol Label Switching (GMPLS) Signaling Resource ReserVation Protocol-Traffic Engineering (RSVP-TE) Extensions", *Network Working Group*; RFC 3473; Jan. 2003; 42 pages.
Bernet, Y., et al., "An Informal Management Model for Diffserv Routers", *Network Working Group*; RFC 3290; May 2002; 56 pages.
Black, D., "Differentiated Services and Tunnels", *Network Working Group*; RFC 2983; Oct. 2000; 14 pages.
Black, D., et al., "Per Hop Behavior Identification Codes", *Network Working Group*; RFC 3140; Jun. 2001; 8 pages.
Blake, S., et al., "An Architecture for Differentiated Services", *Network Working Group*; RFC 2475; Dec. 1998; 36 pages.
Borman, D., et al., "IPv6 Jumbograms", *Network Working Group*; RFC 2675; Aug. 1999; 9 pages.
Braden, R., et al., "Resource ReSerVation Protocol (RSVP)", *Network Working Group*; RFC 2205; Sep. 1997; 112 pages.
Chan, K., et al., "Differentiated Services Quality of Service Policy Information Base", *Network Working Group*; RFC 3317; Mar. 2003; 96 pages.
Charny, A., et al., "Supplemental Information for the New Definition of the EF PHB (Expedited Forwarding Per-Hop Behavior)", *Network Working Group*; RFC 3247; Mar. 2002; 24 pages.
Chen, M., et al., "MultiProtocol Label Switching (MPLS) Source Label draft-chen-mpls-source-label-05", *Network Drafting Group*; Jul. 3, 2014; 13 pages.
Coltun, R., et al., "OSPF for IPv6", *Network Working Group*; RFC 5340; Jul. 2008; 60 pages.
Davie, B., et al., "An Expedited Forwarding PHB (Per-Hop Behavior)", *Network Working Group*; RFC 3246; Mar. 2002; 24 pages.
Deering, S., et al., "Internet Protocol, Version 6 (IPv6) Specification", *Network Working Group*; RFC 2460; Dec. 1998; 39 pages.
Eggert, L., et al., "Unicast UDP Usage guidelines for Application Designers", *Network Working Group*; RFC 5405; Nov. 2008; 27 pages.
Fenner, B., et al., "Management Information Base for the User Datagram Protocol (UDP)", *Network Working Group*; RFC 4113; Jun. 2005; 19 pages.
Grossman, D., "New Terminology and Clarifications for Diffserv", *Netowrk Working Group*; RFC 3260; Apr. 2002; 10 pages.
Hedrick, C., "Routing Information Protocol", *Network Working Group*; RFC 1058; Jun. 1988; 33 pages.
Heinanen, J., et al., "Assured Forwarding PHB Group", *Network Working Group*; RFC 2597; Jun. 1999; 11 pages.
Hopps, C., "Analysis of an Equal-Cost Multi-Path Algorithm", *Network Working Group*; RFC 2992; Nov. 2000; 8 pages.
Housley, R., et al., "Using Advanced Encryption Standard (AES) CCM Mode with IPsec Encapsulating Security Payload (ESP)", *Network Working Group*; RFC 4309; Dec. 2005; 13 pages.
Kent, S., et al., "Security Architecture for the Internet Protocol", *Network Working Group*; RFC 4301; Dec. 2005; 101 pages.
Kompella, K., et al., "Detecting Multi-Protocol Label Switched (MPLS) Data Plane Failures", *Network Working Group*; RFC 4379; Feb. 2006; 50 pages.
Kompella, K., et al., "Procedures for Modifying the Resource reSerVation Protocol (RSVP)", *Network Working Group*; RFC 3936; Oct. 2004; 7 pages.
Malkin, G., et al., "RIP Version 2", *Network Working Group*; RFC 2453; Nov. 1998; 39 pages.
Malkin, G., et al., "RIPng for IPv6", *Network Working Group*; RFC 2080; Jan. 1997; 19 pages.
Martini, L., et al., "Pseudowire Setup and Maintenance Using the Label Distribution Protocol (LDP)", *Network Working Group*; RFC 4447; Apr. 2006; 33 pages.
Moy, J., "OSPF Version 2", *Network Working Group*; RFC 2328; Apr. 1998; 204 pages.
Nadeau, T., et al., "Bidirectional Forwarding Detection (BFD) for the Pseudowire Virtual Circuit Connectivitiy Verification (VCCV)", *Internet Engineering Task Force(IETF)*; Jun. 2010; 14 pages.
Nichols, K., et al., "Definition of Differentiated Services Per Domain Behaviors and Rules for their Specification", *Network Working Group*; RFC 3086; Apr. 2001; 24 pages.
Nichols, K., et al., "Definition of the Differentiated Services Field (DS Field) in the IPv4 and IPv6 Headers", *Network Working Group*; RFC 2474; Dec. 1998; 20 pages.
Polk, J., et al., "A Resource Resergvation Protocol (RSVP) Extension for the Reduction of Bandwidth of a Reservation Flow", *Network Working Group*; RFC 4495; May 2006; 21 pages.
Postel, J., "User Datagram Protocol", *RFC 768*; Aug. 28, 2980; 3 pages.
Rekhter, Y., et al., "A Border Gateway Protocol 4 (BGP-4)", *Network Working Group*; RFFC 4271; Jan. 2006 104 pages.
Rekhter, Y., et al., "Carrying Label Information in BGP-4", *Network Working Group*; RFC 3107; May 2001; 8 pages.
Rosen, E., et al., "BGP/MPLS IP Virtual Private Networks (VPNs)", *Network Working Group*; RFC 4364; Feb. 2006; 47 pages.
Shenker, S., et al., "Specification of Guaranteed Quality of Services", *Network Working Group*; RFC 2212; Sep. 1997; 20 pages.
Socolofsky, T., et al., "A TCP/IP Tutorial", *Network Working Group*; RFC 1180; Jan. 1991; 28 pages.
Thaler, D., et al., "Multipath Issues in Unicast and Multicast Next-Hop Selection", *Network Working Group*; RFC 2991; Nov. 2000; 9 pages.
Wroclawski, J., "Specification of the Controlled-Load Network Element Servicer", *Network Working Group*; RFC 2211; Sep. 1997; 19 pages.
Wroclawski, J., "The Use of RSVP with IETF Integrated Services"*Network Working Group*; RFC 2210; Sep. 1997; 33 pages.

* cited by examiner

| BFD Control | SL | SLI | LSP | L2 |

FIG. 7

SELF-BOOTSTRAPPING BFD SESSION OVER MPLS LSP

FIELD

Embodiments of the invention relate to the intermediate system to establishing bidirectional forwarding detection (BFD for a multi-protocol labels switching (MPLS) label switched path (LSP). In particular, the embodiments describe a method and system for bootstrapping a BFD for an MPLS LSP without requiring the use of LSP Ping.

BACKGROUND

LSP Ping is a function described in RFC 4379 and is an existing function for detecting an MPLS LSP data plane failure. In addition, LSP Ping also provides a mechanism for verifying the MPLS control plane against the MPLS data plane. The verification requires that the LSP is mapped to the same Forwarding Equivalence Class (FEC), at the egress node of the LSP, as the ingress node of the LSP.

BFD is a network protocol that can be used to detect faults between two forwarding engines executed by nodes in a network that are connected by a link. BFD is utilized because it provides low-overhead detection of faults even on physical media that don't support failure detection of any kind, such as Ethernet, virtual circuits, tunnels and MPLS LSPs. BFD establishes a session between two endpoint nodes over a particular link or set of links between the endpoint nodes. If more than one link exists between the nodes, multiple BFD sessions can be established to monitor each one of them.

BFD does not have a discovery mechanism. BFD sessions must be explicitly configured between the endpoint nodes. BFD operates independently of all of underlying transport mechanisms. BFD needs to be encapsulated by whatever transport it uses. For example, monitoring MPLS LSPs involves piggybacking session establishment on LSP ping messaging.

Utilizing BFD instead of LSP ping can reduce compute and storage requirements for a network device. Because the use of LSP ping is computationally intensive relative to BFD. However, BFD cannot be used to replace all of the functionality of LSP ping, such as verifying the MPLS control plane against the data plane. BFD can be used to detect a data plane failure in the forwarding path of an MPLS LSP.

In an MPLS network an LSP may be associated with any of the following FECs: (1) Resource Reservation Protocol (RSVP) LSP_Tunnel IPv4/IPv6 Session (See RFC3209), (2) Label Distribution Protocol (LDP) IPv4/IPv6 prefix (See RFC5036), (3) Virtual Private Network (VPN) IPv4/IPv6 prefix (RFC 4364), (4) Layer 2 VPN (See L2-VPN), (5) Pseudowires based on PWid FEC and Generalized PWid FEC (See RFC 4447), and (6) Border Gateway Protocol (BGP) labeled prefixes (See RFC3107).

BFD is more suitable than LSP ping for being implemented in hardware or firmware due to its fixed packet format where LSP ping has a varied format. Thus, the use of BFD for detecting MPLS LSP data plane faults has the following advantages: (1) support for fault detection for a greater number of LSPs, and (2) fast detection—detection with sub-second granularity is considered to be 'fast detection.' LSP Ping is intended to be used in an environment where fault detection messages are exchanged, either for diagnostic purposes or for infrequent periodic fault detection, in the order of tens of seconds or minutes. Therefore, LSP ping is not suitable for fast detection. BFD, on the other hand, is designed for sub-second fault detection intervals.

SUMMARY

A method is implemented by a network device in a network implementing penultimate hop popping (PHP) for Internet Protocol (IP)/Multi-Protocol Label Swapping (MPLS). The network has a plurality of nodes. The method establishes a bi-directional forwarding detection (BFD) session between an active node and a passive node of an MPLS label switched path (LSP) without an out of band bootstrapping process. The network device is the passive node and the method receives an MPLS packet including a BFD control packet, a source label and a source label indicator. The process then accesses the My Discriminator of the BFD control packet, Your Discriminator of the BFD control packet and the source label of the MPLS packet, checks whether a BFD session exists with the Your Discriminator, and looks up whether the source label and My Discriminator are known, where no BFD session exists with the Your Discriminator. The process further generates a My Discriminator for the passive node, where the source label and My Discriminator are known, establishes the BFD session for a forwarding equivalency class (FEC) identified in the source label, and sends a second BFD control packet in a second MPLS packet to the active node, where the second BFD control packet includes the generated My discriminator for the passive node.

A network device implements a process in a network implementing penultimate hop popping (PHP) for Internet Protocol (IP)/Multi-Protocol Label Swapping (MPLS) where the network has a plurality of nodes. The network device executes the process to establish a bi-directional forwarding detection (BFD) session between an active node and a passive node of an MPLS label switched path (LSP) without an out of band bootstrapping process, where the network device is the passive node. The network device includes a non-transitory machine-readable storage medium to store a BFD bootstrap module and MPLS module, and a network processor communicatively coupled to the non-transitory machine-readable storage medium. The network processor executes the BFD bootstrap module, where the BFD bootstrap module is configured to receive an MPLS packet including a BFD control packet, a source label and a source label indicator, to access the My Discriminator of the BFD control packet, Your Discriminator of the BFD control packet and the source label of the MPLS packet, to check whether a BFD session exists with the Your Discriminator, to look up whether the source label and My Discriminator are known, where no BFD session exists with the Your Discriminator, to generate a My Discriminator for the passive node, where the source label and My Discriminator are known, to establish the BFD session for a forwarding equivalency class (FEC) identified in the source label, and to send a second BFD control packet in a second MPLS packet to the active node, where the second BFD control packet includes the generated My discriminator for the passive node.

A computing device implements a plurality of virtual machines for implementing network function virtualization (NFV), wherein a virtual machine from the plurality of virtual machines is configured to execute a method. The computing device is in a network implementing penultimate hop popping (PHP) for Internet Protocol (IP)/Multi-Protocol Label Swapping (MPLS). The network has a plurality of nodes. The method establishes a bi-directional forwarding detection (BFD) session between an active node and a passive node of an MPLS label switched path (LSP) without an out of band bootstrapping process. The computing device is the passive node of the LSP. The computing device includes a non-transitory machine-readable storage medium to store a BFD bootstrap module, MPLS module and BFD module, and a processor communicatively coupled to the non-transitory machine-readable storage medium. The processor executes the BFD bootstrap module. The BFD bootstrap module is configured to receive an MPLS packet including a BFD control packet, a source label and a source label indicator, to access the My Discriminator of the BFD control packet, Your Discriminator of the BFD control packet and the source label of the MPLS packet, to check whether a BFD session exists with the Your Discriminator, to look up whether the source label and My Discriminator are known, where no BFD session exists with the Your Discriminator, to generate a My Discriminator for the passive node, where the source label and My Discriminator are known, to establish the BFD session for a forwarding equivalency class (FEC) identified in the source label, and to send a second BFD control packet in a second MPLS packet to the active node, where the second BFD control packet includes the generated My discriminator for the passive node.

A control plane device is configured to implement at least one centralized control plane for a software defined network (SDN). The centralized control plane is further configured to execute a method, where the computing device is in a network implementing penultimate hop popping (PHP) for Internet Protocol (IP)/Multi-Protocol Label Swapping (MPLS). The network has a plurality of nodes. The method establishes a bi-directional forwarding detection (BFD) session between an active node and a passive node of an MPLS label switched path (LSP) without an out of band bootstrapping process, where the control plane device is the passive node. The control plane device includes a non-transitory machine-readable storage medium to store a BFD bootstrap module, MPLS module and BFD module, and a network processor communicatively coupled to the non-transitory machine-readable storage medium. The network processor executes the BFD bootstrap module. The BFD bootstrap module is configured to receive an MPLS packet including a BFD control packet, a source label and a source label indicator, to access the My Discriminator of the BFD control packet, Your Discriminator of the BFD control packet and the source label of the MPLS packet, to check whether a BFD session exists with the Your Discriminator, to look up whether the source label and My Discriminator are known, where no BFD session exists with the Your Discriminator, to generate a My Discriminator for the passive node, where the source label and My Discriminator are known, to establish the BFD session for a forwarding equivalency class (FEC) identified in the source label, and to send a second BFD control packet in a second MPLS packet to the active node, where the second BFD control packet includes the generated My discriminator for the passive node.

BRIEF DESCRIPTION OF THE DRAWINGS

The invention may best be understood by referring to the following description and accompanying drawings that are used to illustrate embodiments of the invention. In the drawings:

FIG. 7 is a diagram of an example MPLS packet including the source label and source label indicator.

DESCRIPTION OF EMBODIMENTS

Figure 1:
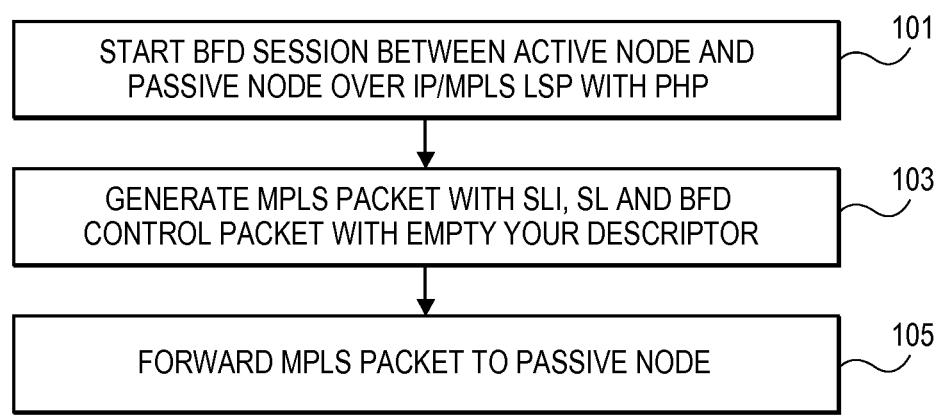
FIG. 1 is a flowchart of one embodiment of a process for BFD bootstrapping over an MPSL LSP executed by an active node.

The following description describes methods and apparatus for BFD bootstrapping over an MPLS LSP executed by the active node and passive node at each endpoint of the LSP. This process is an alternative to the use of the LSP ping function for BFD bootstrapping for an MPLS LSP. The method and apparatus overcome the problem of penultimate hop popping (PHP) that would otherwise prevent the establishment of a BFD session without the use of the out of band LSP ping. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The following abbreviations may be commonly utilized herein below ACH—Associated Channel; BFD—Bidirectional Forwarding Detection; IP—Internet Protocol; LSP—Label Switched Path; MPLS—Multiprotocol Label Switching; PHP—Penultimate Hop Popping; PW—Pseudowire; SL—Source Label; SLI—Source Label Indicator; and UDP—user datagram protocol.

The embodiments of the invention provide a solution to a particular technical problem related to establishing BFD sessions over MPLS LSPs. Because of the common usage of penultimate hop popping (PHP) in an IP/MPLS network a BFD session over an MPLS LSP requires the mapping of a My Discriminator by an active node to the My Discriminator of a passive node be established out of band. PHP is the removal of a label or set of labels at the hop of an LSP that is immediately preceding the endpoint of the LSP. Popping of these labels at the pen-ultimate hop precludes the gathering of My Discriminator and Your Discriminator, as well as, associated FEC for a BFD control packet, because this information is in the labels that are popped. The LSP Ping with a BFD Discriminator TLV is used to bootstrap the BFD session. However, the embodiments of the invention make use of the MPLS Source Label in the MPLS label stack of BFD packets to expedite BFD session establishment by making the use of MPLS LSP ping unnecessary and thus making BFD bootstrapping process simpler and more robust.

RFC 5884 established that in order to establish a BFD session over an MPLS LSP, the active node must send the LSP Ping with BFD Discriminator TLV in it. The receiving passive node would use the discriminator values in the TLV, specifically the My Discriminator value of the active node, to establish the BFD session and will send a BFD control packet with the My Discriminator of the passive node to the active node. As used herein, the 'active node,' is the node at one endpoint of the MPLS LSP attempting to initiate the BFD session, whereas the 'passive node' is the node at the other endpoint of the MPLS LSP. The nodes can be network elements or similar devices as discussed further herein below.

There are several problems with the existing solution for establishing the BFD sessions. Processing the LSP ping and the BFD discriminators is required because of the standard usage of PHP in IP/MPLS networks. PHP hides the identity of a source at the endpoint of the LSP, because this information is 'popped' at the node which is the hop preceding the endpoint. Each BFD control packet includes a 'My Discriminator' and a 'Your Discriminator' relative to the sending node, which identify each endpoint of the BFD session. Thus, PHP makes it impossible to map the source and discriminator without the use of an out of band bootstrapping process. The LSP ping is the out of band process for supplying this information to the LSP endpoint.

The embodiments of the invention solve these technical problems by inserting a source label indicator (SLI) followed by source label (SL) into the labels stack of an MPLS packet. The source label uniquely identifies a node in the particular administrative domain from which the MPLS packet originated. By inserting this information into the label stack of BFD over an MPLS LSP the process preserves identity of the source regardless of whether PHP is being used or not in the network. Thus, a passive node can map a My Discriminator in an ingress BFD control packet, whether in IP/UDP or PW-ACH encapsulation, to the source and the bootstrapping process utilizing LSP Ping can be eliminated.

The embodiments of the invention provide an advantage over prior solutions. The embodiments provide a process of self-bootstrapping a BFD session over MPLS LSP that simplifies the process of establishing BFD sessions by eliminating the need for out of band bootstrapping process by use of a BFD Discriminator TLV in an LSP Ping. This reduces computational resource requirements and enables lower level implementation such as a hardware level implementation. Further, the embodiments expedite BFD over MPLS LSP session establishment, simplify BFD over MPLS LSP session establishment, and makes establishment of a BFD over MPLS LSP session more robust.

In one embodiment, the process for BFD bootstrapping can also be applied to segment routed MPLS networks. The process and the structures for this implementation are analogous to those described herein below. For sake of clarity and to avoid redundancy the example of implementing the embodiments with IP/MPLS networks and structures is provided, however, those skilled in the art would understand that the processes, structures and techniques are also applicable to segment routed networks.

Figure 7:
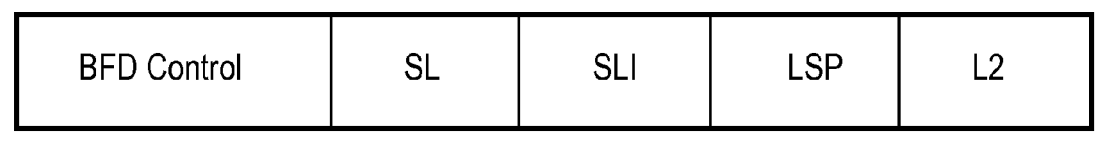

FIG. 1 is a flowchart of one embodiment of a process for BFD bootstrapping over an MPSL LSP executed by an active node. The configuration of the MPLS network and determination of which LSP be monitored using BFD can be implemented using any network administrative software or system. The process of the active node is implemented by a network device or similar node in an MPLS network. The process can be initiated by creating a BFD session between the active node and a passive node over an LSP in an MPLS or more specifically an IP/MPLS network (Block 101). The process is designed to ensure the proper establishment of the BFD where PHP is implemented in the MPLS network. However, it is not necessary that PHP actually be operative for the process to function. The active node generates an MPLS packet that is constructed by pushing labels onto the payload of the MPLS packet, where the labels include at least a source label indicator and a source label (Block 103). An example of the structure of such a packet is shown in FIG. 7.

The packet includes L2 packet encapsulation, the LSP label and the SLI and SL labels. The packet can also include a BFD control packet as the payload. The SLI and SL are introduced to provide source information that will survive a PHP process. The SLI serves to identify that the next label is the source label. The SLI can have any format that is suitable for being identified at the endpoint for appropriate processing of the SL.

Upon completion of the MPLS packet generation the packet can be forwarded to the next hop of the LSP associated with the packet (Block 105). The packet will traverse the path defined by the LSP before arriving at the other endpoint of the LSP, which is the passive node for the BFD session to be established.

Figure 2:
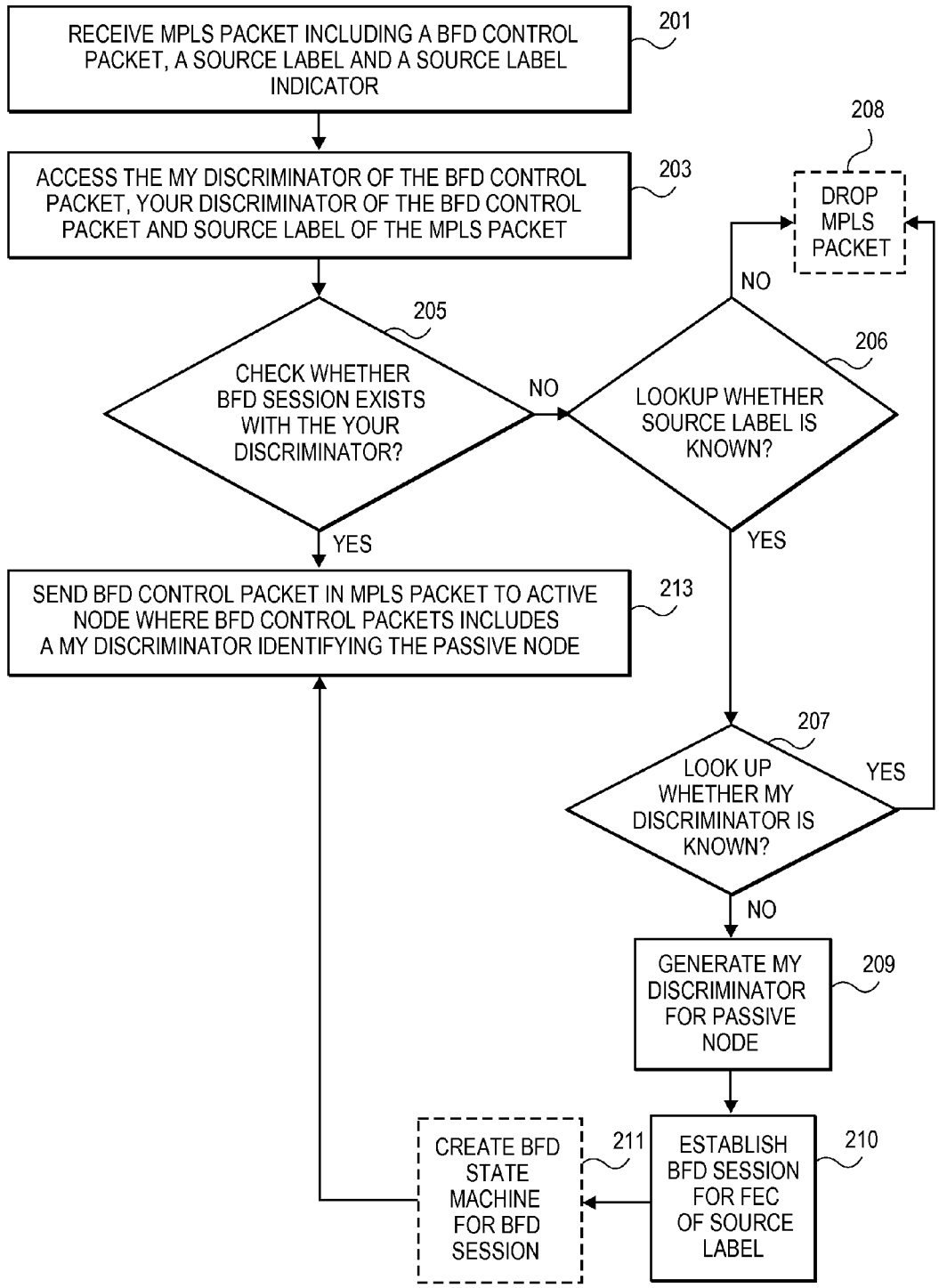
FIG. 2 is a flowchart of one embodiment of a process for BFD bootstrapping over the MPSL LSP executed by the passive node.

FIG. 2 is a flowchart of one embodiment of a process for BFD bootstrapping over the MPSL LSP executed by the passive node. In one embodiment, this process is triggered in response to the receipt of an MPLS message from the active node. The MPLS message is received from the active node where the MPLS message includes a BFD control packet, a source label (SL) and a source label indicator (SLI) (Block 201). The MPLS packet can be processed by a BFD bootstrapping module or similar component that implements the process described herein. The MPLS packet is accessed to retrieve the My Discriminator, Your Discriminator and source label of the MPLS packet (Block 203). The Your Discriminator, which is an identifier for the passive node is checked to determine whether it contains a valid Your Discriminator for the passive node (Block 205). If the value is null, invalid or predetermined to identify a new BFD session to establish, then the process proceeds to further lookup whether the source label is known to the passive node (Block 206). This information can be stored in a BFD session table or similar data structure that tracks the BFD sessions in which the passive node participates. If the BFD session is not tied to a known source label, then the packet is dropped as it is assumed to be invalid (Block 208).

If the source label is found, then a look up of whether the My Discriminator is performed to determine whether is known to the passive node (Block 207). If the My Discriminator is known, then the MPLS packet is dropped (Block 208). If the My Discriminator is not known, then the assumption is made that a new BFD session is to be established for the forwarding equivalency class (FEC) of the source label (Block 210). A My Discriminator is generator by the passive node to identify the passive node for the BFD session to be created. Similarly, a BFD state machine is generated to implement the handling of further BFD control packets according to the BFD protocol (Block 211). The regular transmission of BFD control packets is then implemented by the BFD state machine where each BFD control packet includes the My Discriminator identifying the passive node (Block 213). If the Your Discriminator of the BFD control packet in the received MPLS packet had not been empty and a corresponding BFD session identified (Block 205), then the process would have proceeded directly to sending regular BFD control packets for the BFD session (Block 213).

Figure 3:
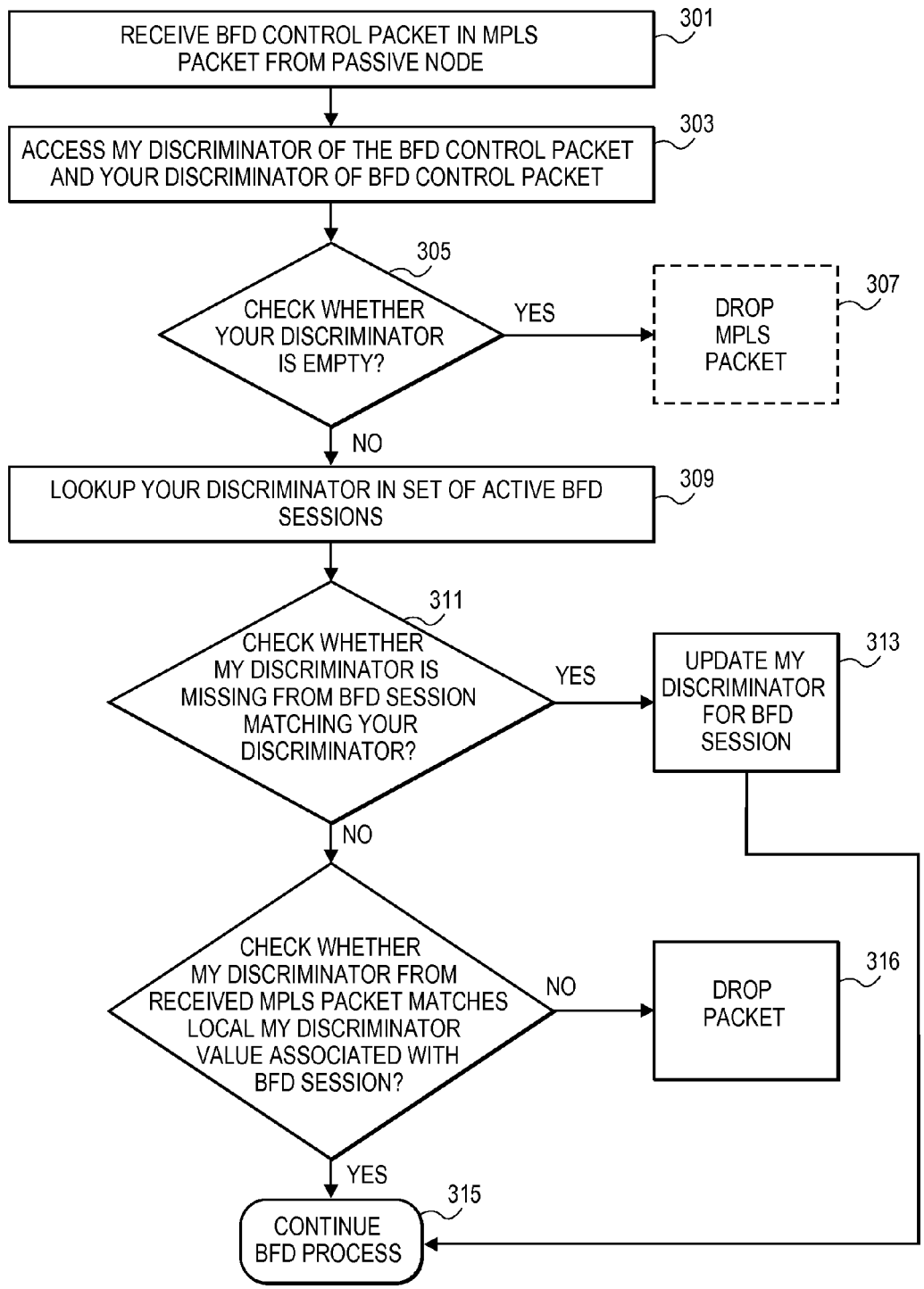
FIG. 3 is a flowchart of one embodiment of a further process for BFD bootstrapping over the MPSL LSP executed by the active node.

FIG. 3 is a flowchart of one embodiment of a further process for BFD bootstrapping over the MPSL LSP executed by the active node. As the BFD packets are received back from the passive node at the active node via the MPLS network (Block 301), each of the My Discriminators and Your Discriminators are accessed. A check is made whether the Your Discriminator is empty (Block 305), in which case the received MPLS packet is dropped (Block 307) as being invalid. If the Your Discriminator is not empty, then the Your Discriminator is utilized to look up the active BFD session in a BFD session table or similar data structure that tracks the BFD sessions at the active node (Block 309). A check can then be made whether the retrieved BFD session entry has a blank field or missing BFD session Your Discriminator value (Block 311). If the value is empty, then the My Discriminator for the BFD session can be updated, before the standard BFD process continues (Block 315). If the value is not empty, then a check can be made whether the My Discriminator from the received MPLS packet matches the local My Discriminator value associated with the BFD session (Block 314). If the My Discriminator does not match, then the MPLS packet can be dropped (Block 316). If the My Discriminator does match, then the standard BFD process can immediately proceed (Bock 315).

Figure 4:
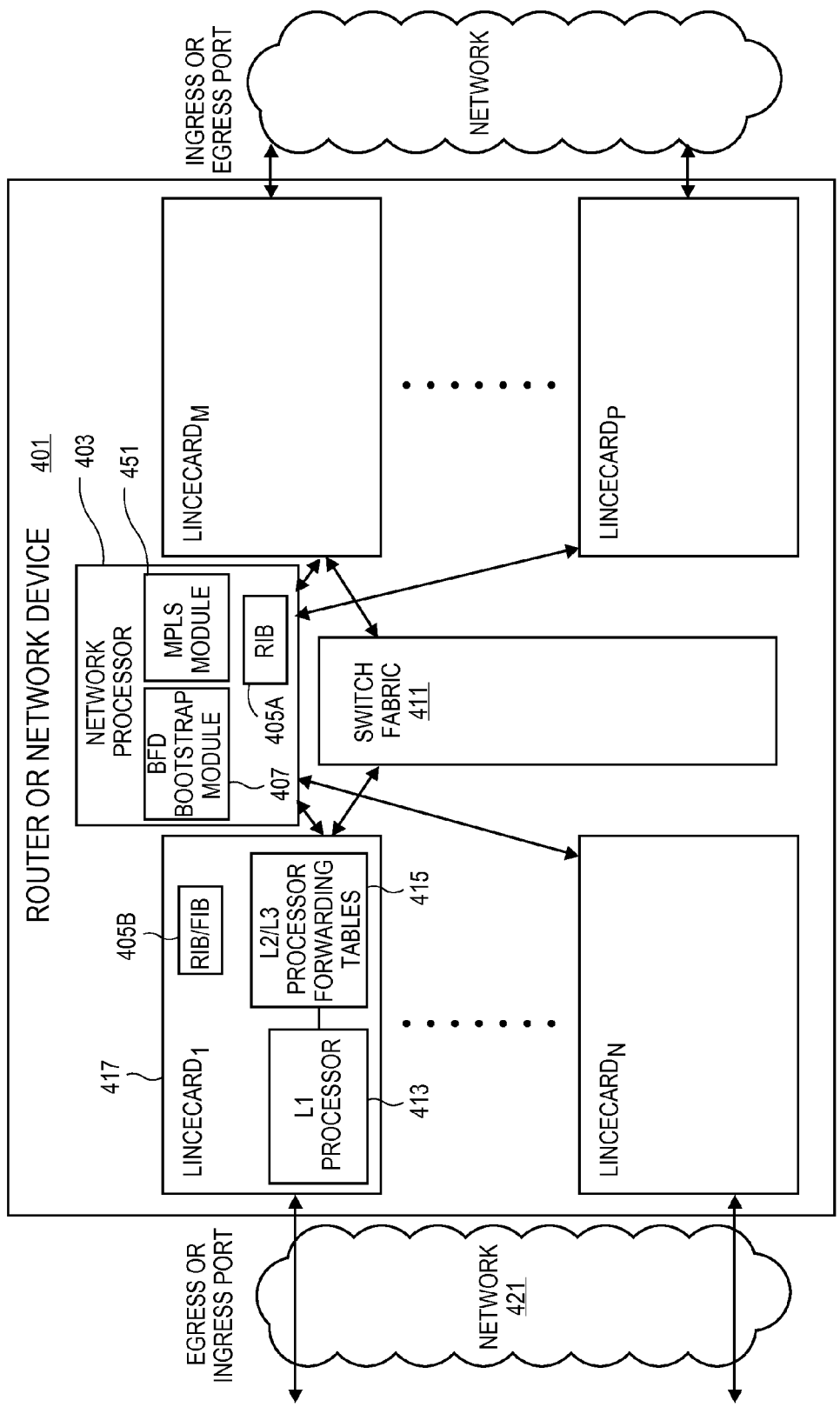
FIG. 4 is a diagram of one embodiment of a network device implementing the BFD bootstrapping process.

FIG. 4 is a diagram of one embodiment of a network device implementing the BFD bootstrapping process.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 401 or network device or similar computing device. The router 401 can have any structure that enables it to receive data traffic and forward it toward its destination. The router 401 can include a network processor 403 or set of network processors that execute the functions of the router 401. A 'set,' as used herein, is any positive whole number of items including one item. The router 401 or network element can execute BFD (including the BFD bootstrapping) and MPLS computation functionality via a network processor 403 or other components of the router 401.

The BFD and MPLS functions can be implemented as modules in any combination of software, including firmware, and hardware within the router. The functions of the BFD process that are executed and implemented by the router 401 include those described further herein above. In the illustrated example, the functions are implemented by the network processor 403 that executes a BFD Bootstrapping module 407 and MPLS module 451 along with the routing information base 405A.

In one embodiment, the router 401 can include a set of line cards 417 that process and forward the incoming data traffic toward the respective destination nodes by identifying the destination and forwarding the data traffic to the appropriate line card 417 having an egress port that leads to or toward the destination via a next hop. These line cards 417 can also implement the routing information base or forwarding information base 405B, or a relevant subset thereof. The line cards 417 can also implement or facilitate the BFD and MPLS process functions described herein above. The line cards 417 are in communication with one another via a switch fabric 411 and communicate with other nodes over attached networks 421 using Ethernet, fiber optic or similar communication links and media.

In other embodiments, the processes can be implemented by a split-architecture node, where the control plane is remote from the data/forwarding plane. In this case, the BFD and MPLS process can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

Figures 5A, 5B:
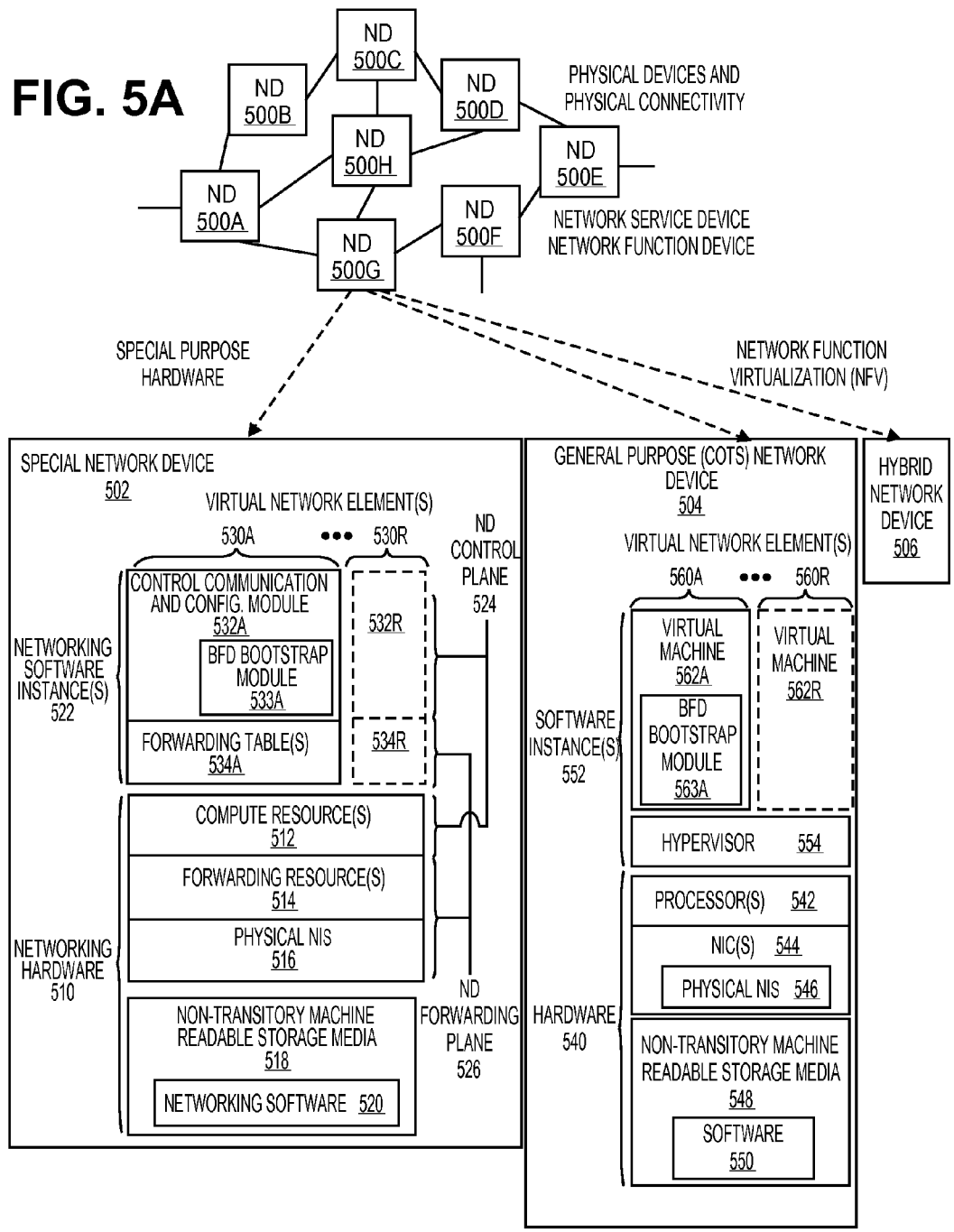
FIG. 5A illustrates connectivity between network devices (NDs) within an exemplary network, as well as three exemplary implementations of the NDs, according to some embodiments of the invention.
FIG. 5B illustrates an exemplary way to implement the special-purpose network device 502 according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A). The BFD bootstrapping module 533A implements the processes described herein above including BFD bootstrapping as part of the Control communication and Configuration Module 532A or similar aspect of the networking software, which may be loaded and stored in the non-transitory machine readable media 518 or in a similar location.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate a hypervisor 554 (sometimes referred to as a virtual machine monitor (VMM)) and one or more virtual machines 562A-R that are run by the hypervisor 554, which are collectively referred to as software instance(s) 552. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 562A-R, and that part of the hardware 540 that executes that virtual machine (be it hardware dedicated to that virtual machine and/or time slices of hardware temporally shared by that virtual machine with others of the virtual machine(s) 562A-R), forms a separate virtual network element(s) 560A-R. In one embodiment, the virtual machines 532A-R may execute the described BFD bootstrapping module 563A and related software described herein above.

The virtual network element(s) 560A-R perform similar functionality to the virtual network element(s) 530A-R. For instance, the hypervisor 554 may present a virtual operating platform that appears like networking hardware 510 to virtual machine 562A, and the virtual machine 562A may be used to implement functionality similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 562A-R differently. For example, while embodiments of the invention are illustrated with each virtual machine 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 554 includes a virtual switch that provides similar forwarding services as a physical Ethernet switch. Specifically, this virtual switch forwards traffic between virtual machines and the NIC(s) 544, as well as optionally between the virtual machines 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figures 5C, 5D, 5E, 5F:
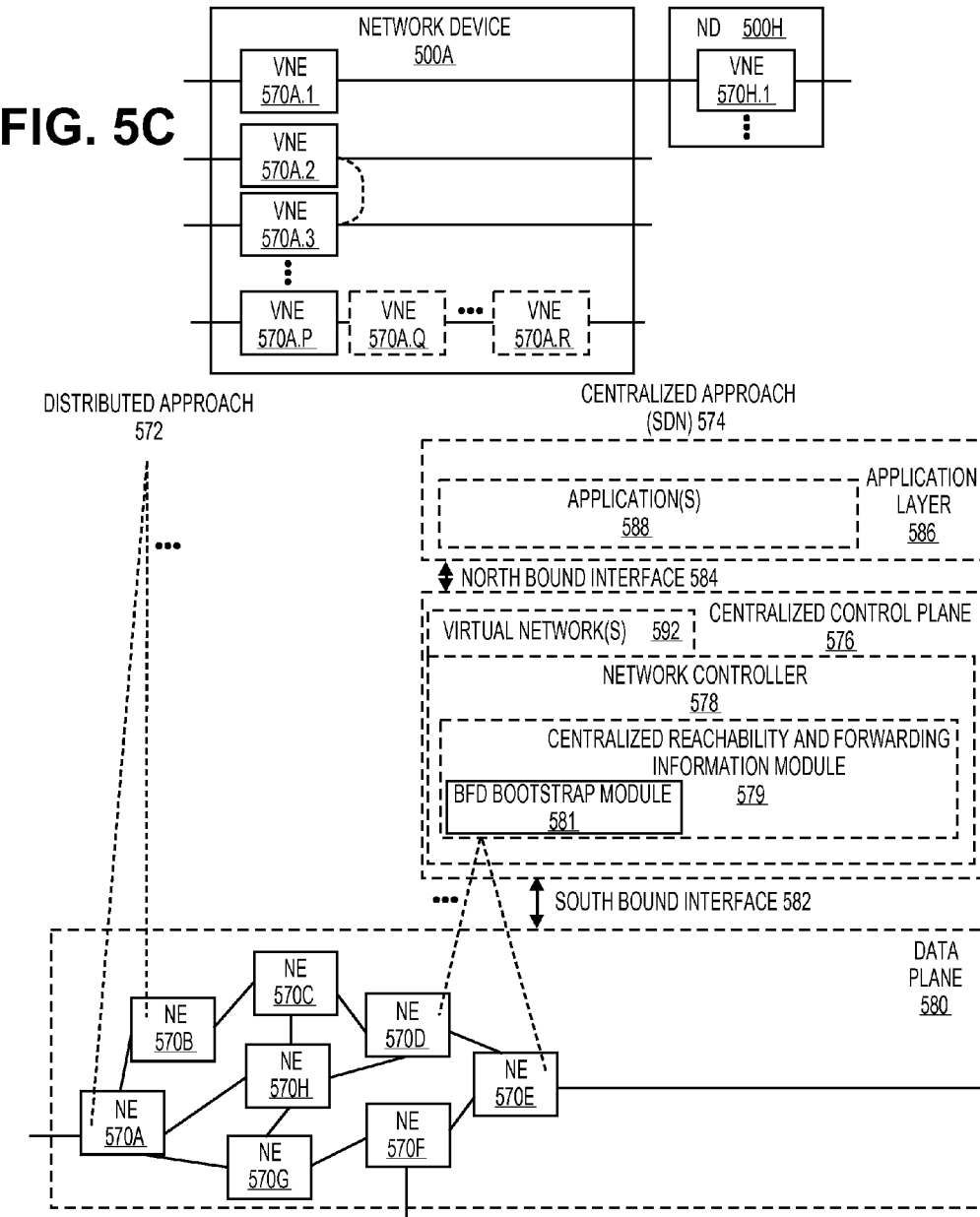
FIG. 5C illustrates various exemplary ways in which virtual network elements (VNEs) may be coupled according to some embodiments of the invention.
FIG. 5D illustrates a network with a single network element (NE) on each of the NDs of FIG. 5A, and within this straight forward approach contrasts a traditional distributed approach (commonly used by traditional routers) with a centralized approach for maintaining reachability and forwarding information (also called network control), according to some embodiments of the invention.
FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention.
FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., user-name/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the virtual machines 562A-R may operate as servers; the same would be true for the hybrid network device 506; in the case of the special-purpose network device 502, one or more such servers could also be run on a hypervisor executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the centralized reachability and forwarding information module 579 may include the BFD bootstrapping module 581 and related software as described herein above.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
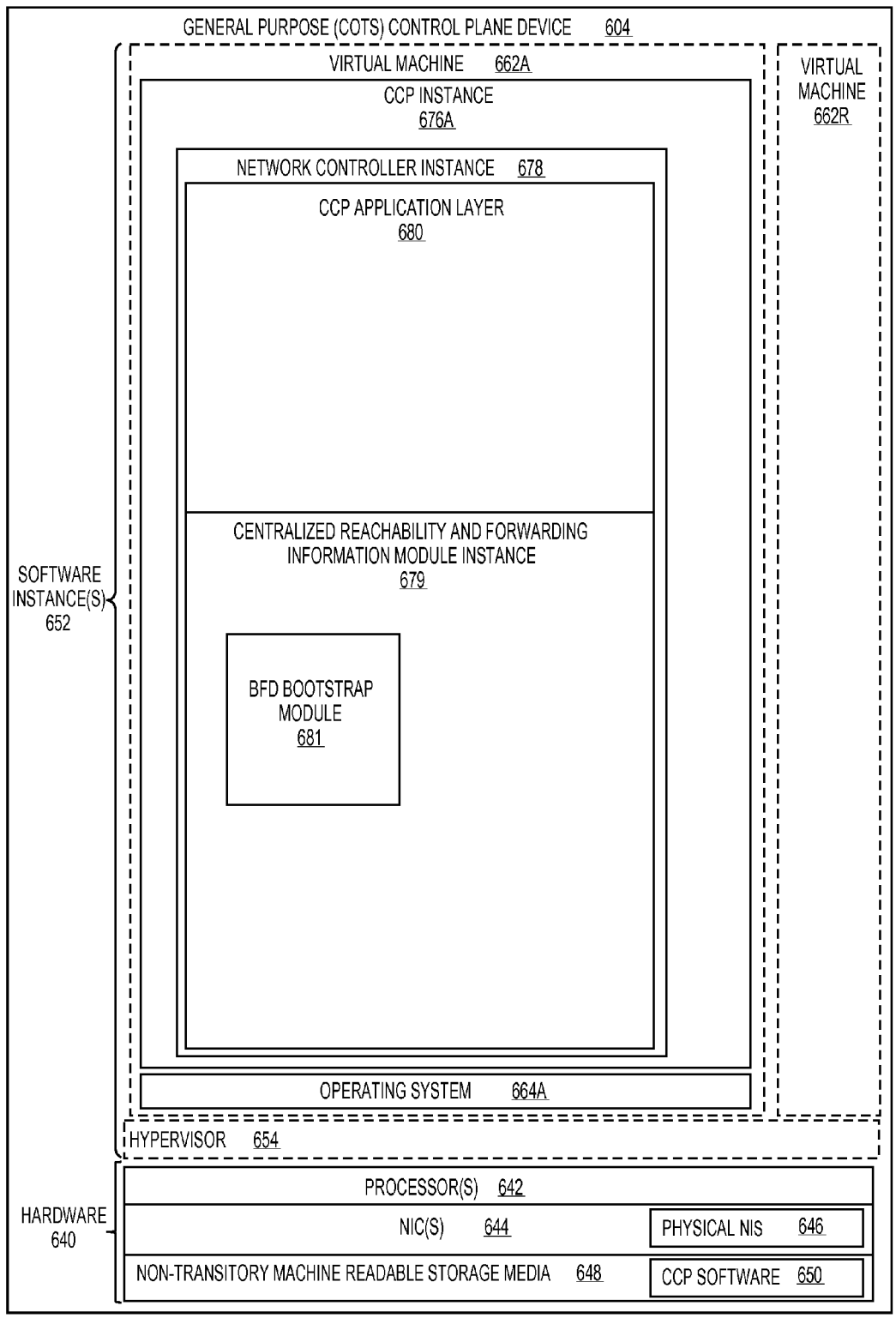
FIG. 6 illustrates a general purpose control plane device 604 including hardware 540 comprising a set of one or more processor(s) 542 (which are often Commercial off-the-shelf (COTS) processors) and network interface controller(s) 544 (NICs; also known as network interface cards) (which include physical NIs 546), as well as non-transitory machine readable storage media 548 having stored therein centralized control plane (CCP) software 550), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a hypervisor 654 (sometimes referred to as a virtual machine monitor (VMM)) and one or more virtual machines 662A-R that are run by the hypervisor 654; which are collectively referred to as software instance(s) 652. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 650 (illustrated as CCP instance 676A) on top of an operating system 664A are typically executed within the virtual machine 662A. In embodiments where compute virtualization is not used, the CCP instance 676A on top of operating system 664A is executed on the "bare metal" general purpose control plane device 604.

The operating system 664A provides basic processing, input/output (I/O), and networking capabilities. In some embodiments, the CCP instance 676A includes a network controller instance 678. The network controller instance 678 includes a centralized reachability and forwarding information module instance 679 (which is a middleware layer providing the context of the network controller 678 to the operating system 664A and communicating with the various NEs), and an CCP application layer 680 (sometimes referred to as an application layer) over the middleware layer (providing the intelligence required for various network operations such as protocols, network situational awareness, and user-interfaces). In one embodiment, the centralized reachability and forwarding information module 679 may include the BFD bootstrapping module 681 and related software as described herein above.

At a more abstract level, this CCP application layer 680 within the centralized control plane 676 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path— multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a network implementing penultimate hop popping (PHP) for Internet Protocol (IP)/Multi-Protocol Label Swapping (MPLS), the network having a plurality of nodes, the method to establish a bi-directional forwarding detection (BFD) session between an active node and a passive node of an MPLS label switched path (LSP) without an out of band bootstrapping process, where the network device is the passive node, the method comprising the steps of:

receiving an MPLS packet including a BFD control packet, a source label and a source label indicator;

accessing the My Discriminator of the BFD control packet, Your Discriminator of the BFD control packet and the source label of the MPLS packet;

checking whether a BFD session exists with the Your Discriminator;

looking up whether the source label is known, where no BFD session exists with the Your Discriminator;

looking up whether the My Discriminator is known, where the source label is known;

generating a My Discriminator for the passive node, where the source label is known and the My Discriminator is not known;

establishing the BFD session for a forwarding equivalency class (FEC) identified in the source label; and sending a second BFD control packet in a second MPLS packet to the active node, where the second BFD control packet includes the generated My discriminator for the passive node.

2. The method of claim 1, further comprising:
creating a BFD state machine for the BFD session.

3. The method of claim 1, wherein the source label indicator indicates that a next label is the source label containing the FEC for the BFD session.

4. The method of claim 1, wherein the network implements segment routing.

5. The method of claim 1, further comprising:
dropping the received MPLS packet where the lookup of the source label and My Discriminator indicate the BFD session is not known.

6. A network device in a network implementing penultimate hop popping (PHP) for Internet Protocol (IP)/Multi-Protocol Label Swapping (MPLS), the network having a plurality of nodes, the network device to execute a method to establish a bi-directional forwarding detection (BFD) session between an active node and a passive node of an MPLS label switched path (LSP) without an out of band bootstrapping process, where the network device is the passive node, the network device comprising:

a non-transitory machine-readable storage medium to store a BFD bootstrap module and MPLS module; and a network processor communicatively coupled to the non-transitory machine-readable storage medium, the network processor to execute the BFD bootstrap module, the BFD bootstrap module configured to receive an MPLS packet including a BFD control packet, a source label and a source label indicator, to access the My Discriminator of the BFD control packet, Your Discriminator of the BFD control packet and the source label of the MPLS packet, to check whether a BFD session exists with the Your Discriminator, to look up whether the source label is known, where no BFD session exists with the Your Discriminator, to look up whether the My Discriminator is known, where the source label is known, to generate a My Discriminator for the passive node, where the source label and My Discriminator are known, to establish the BFD session for a forwarding equivalency class (FEC) identified in the source label, and to send a second BFD control packet in a second MPLS packet to the active node, where the second BFD control packet includes the generated My discriminator for the passive node.

7. The network device of claim 6, wherein the network processor is configured to execute the BFD bootstrap module which is further configured to create a BFD state machine for the BFD session.

8. The network device of claim 6, wherein the source label indicator indicates that a next label is a source label containing the FEC for the BFD session.

9. The network device of claim 6, wherein the network implements segment routing.

10. The network device of claim 6, wherein the network processor is configured to execute the BFD bootstrap module which is further configured to drop the received MPLS packet where the lookup of the source label and My Discriminator indicate the BFD session is not known.

11. A computing device implementing a plurality of virtual machines for implementing network function virtualization (NFV), wherein a virtual machine from the plurality of virtual machines is configured to execute a method, where the computing device is in a network implementing penultimate hop popping (PHP) for Internet Protocol (IP)/Multi-Protocol Label Swapping (MPLS), the network having a plurality of nodes, the method to establish a bi-directional forwarding detection (BFD) session between an active node and a passive node of an MPLS label switched path (LSP) without an out of band bootstrapping process, where the computing device is the passive node, the computing device comprising:

a non-transitory machine-readable storage medium to store a BFD bootstrap module, MPLS module and BFD module; and a processor communicatively coupled to the non-transitory machine-readable storage medium, the processor to execute the BFD bootstrap module, the BFD bootstrap module configured to receive an MPLS packet including a BFD control packet, a source label and a source label indicator, to access the My Discriminator of the BFD control packet, Your Discriminator of the BFD control packet and the source label of the MPLS packet, to check whether a BFD session exists with the Your Discriminator, to look up whether the source label is known, where no BFD session exists with the Your Discriminator, to look up whether the My Discriminator is known, where the source label is known, where no BFD session exists with the Your Discriminator, to generate a My Discriminator for the passive node, where the source label and My Discriminator are known, to establish the BFD session for a forwarding equivalency class (FEC) identified in the source label, and to send a second BFD control packet in a second MPLS packet to the active node, where the second BFD control packet includes the generated My discriminator for the passive node.

12. The computing device of claim 11, wherein the network processor is configured to execute the BFD bootstrap module which is further configured to create a BFD state machine for the BFD session.

13. The computing device of claim 11, wherein the source label indicator indicates that a next label is a source label containing the FEC for the BFD session.

14. The computing device of claim 11, wherein the network implements segment routing.

15. The computing device of claim 11, wherein the network processor is configured to execute the BFD bootstrap module which is further configured to drop the received MPLS packet where the lookup of the source label and My Discriminator indicate the BFD session is not known.

16. A control plane device configured to implement at least one centralized control plane for a software defined network (SDN), the centralized control plane configured to execute a method, where the computing device is in a network implementing penultimate hop popping (PHP) for Internet Protocol (IP)/Multi-Protocol Label Swapping (MPLS), the network having a plurality of nodes, the method to establish a bi-directional forwarding detection (BFD) session between an active node and a passive node of an MPLS label switched path (LSP) without an out of band bootstrapping process, where the control plane device is the passive node, the control plane device comprising:
- a non-transitory machine-readable storage medium to store a BFD bootstrap module, MPLS module and BFD module; and
- a network processor communicatively coupled to the non-transitory machine-readable storage medium, the network processor to execute the BFD bootstrap module, the BFD bootstrap module configured to receive an MPLS packet including a BFD control packet, a source label and a source label indicator, to access the My Discriminator of the BFD control packet, Your Discriminator of the BFD control packet and the source label of the MPLS packet, to check whether a BFD session exists with the Your Discriminator, to look up whether the source label is known, where no BFD session exists with the Your Discriminator, to look up whether the My Discriminator is known, where the source label is known, to generate a My Discriminator for the passive node, where the source label and My Discriminator are known, to establish the BFD session for a forwarding equivalency class (FEC) identified in the source label, and to send a second BFD control packet in a second MPLS packet to the active node, where the second BFD control packet includes the generated My discriminator for the passive node.

17. The control plane device of claim 16, wherein the network processor is configured to execute the BFD bootstrap module which is further configured to create a BFD state machine for the BFD session.

18. The control plane device of claim 16, wherein the source label indicator indicates that a next label is a source label containing the FEC for the BFD session.

19. The control plane device of claim 16, wherein the network implements segment routing.

20. The control plane device of claim 16, wherein the network processor is configured to execute the BFD bootstrap module which is further configured to drop the received MPLS packet where the lookup of the source label and My Discriminator indicate the BFD session is not known.

* * * * *